(12) United States Patent
Ross

(10) Patent No.: US 6,749,151 B1
(45) Date of Patent: Jun. 15, 2004

(54) PORTABLE AIRCRAFT HANGAR

(75) Inventor: Linda K. Ross, Ft. Walton Beach, FL (US)

(73) Assignee: Rolin Industries, Inc., Ft. Walton Beach, FL (US)

( * ) Notice: Subject to any disclaimer, the term of this patent is extended or adjusted under 35 U.S.C. 154(b) by 0 days.

(21) Appl. No.: 10/435,609

(22) Filed: May 9, 2003

(51) Int. Cl.[7] .................................................. B64F 1/00
(52) U.S. Cl. ................ 244/1 R; 244/114 R; 135/88.01; 135/88.03
(58) Field of Search ............................ 244/1 R, 114 R; 135/88.01, 88.03

(56) References Cited

U.S. PATENT DOCUMENTS 4,598,883 A * 7/1986 Suter ......................... 244/1 R
4,613,096 A    9/1986 Pugh
5,179,968 A    1/1993 Deichmann

FOREIGN PATENT DOCUMENTS

DE    1097825    2/1959

* cited by examiner

*Primary Examiner*—J. Woodrow Eldred
(74) *Attorney, Agent, or Firm*—Holland & Knight LLP

(57) ABSTRACT

Disclosed is a portable aircraft hangar assembly for use with aircraft having a series of rotor blades. The assembly is specifically designed to support a canopy over the series of rotor blades. This is accomplished by positioning a series of mounts between the undersurface of the canopy and the rotor assembly of the helicopter. The assembly further includes rotor sleeves which can be slid over the ends of each rotor blade. The rotor sleeves are connected to the canopy by way of a series of adjustment straps and coupling members.

10 Claims, 8 Drawing Sheets

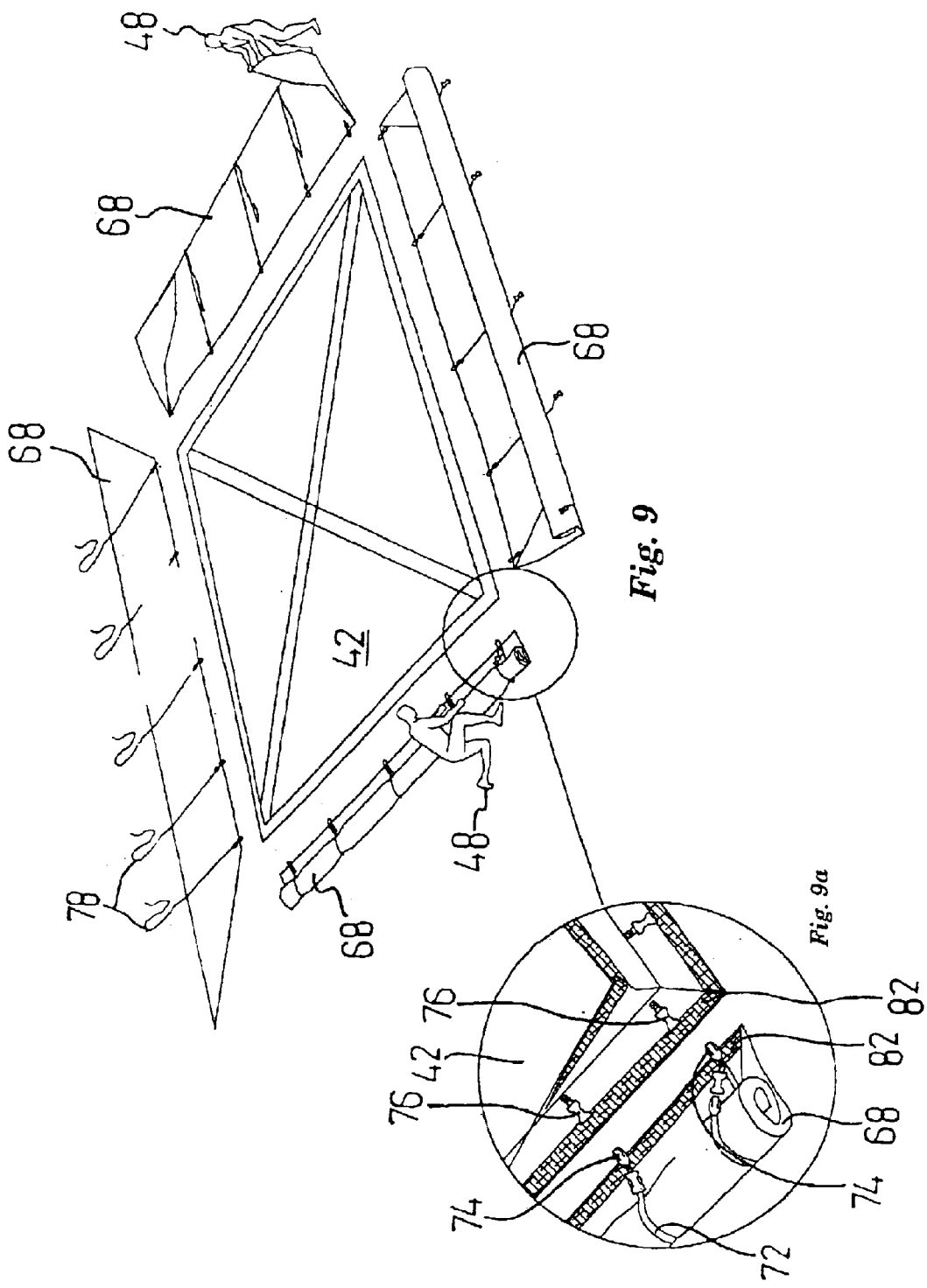

PORTABLE AIRCRAFT HANGAR

BACKGROUND OF THE INVENTION

1. Field of the Invention

This invention relates to a portable aircraft hangar. More particularly, the present invention relates to a portable canopy that is suspended over a helicopter's rotor assembly.

2. Description of the Background Art

The use of portable hangars is known in the prior art. Portable hangars are used in situations where permanent fixed hangars are inaccessible and are designed to be easily and quickly installed with a minimum of effort. When installed, the hangars protect aircraft from unwanted environmental factors, such as heat, rain, and snow, and can also be used as camouflage to prevent unwanted detection of the aircraft.

An example of a portable hangar is disclosed in U.S. Pat. No. 4,613,0962 Pugh. The hanger of Pugh includes a sheet of protective covering material that is supported by the main rotor blade, which serves as a ridge-pole running forward and aft along an offset center line of the helicopter body. The protector further includes main rotor support holders, main rotor tie down means and a plurality of tension binding straps. The protective covering material includes a cap portion located in the center portion of the sheet that is adapted to fit over the governors or other parts on top of the main rotor drive system in a manner such that no stress is placed on these parts.

An additional portable hangar is disclosed in U.S. Pat. No. 5,179,9688 to Deichmann. Deichmann discloses a climatic heat aircraft protective (CHAP) screen that is especially for use with helicopters. The CHAP screen includes a containment bag that is used to compactly stow the screen prior to deployment and is additionally used to secure the screen to a helicopter's rotor blade assembly during deployment. Tow ropes are included at the ends of radial deployment strips to facilitate securing the screen in a deployed condition. When fully deployed the screen is operative to reflect sunlight while allowing air to pass through there.

Although each of these prior systems achieves its own individual objectives, they both suffer from similar drawbacks. Namely, neither Pugh nor Deichmann disclose hangars which are adapted to be supported above the rotors of a helicopter. Moreover, neither of these devices is adjustable to accommodate varying aircraft sizes. Furthermore, these assemblies are complicated to deploy requiring several individuals to deploy and excessive amounts of time. Thus, there exists a need in the art for a portable aircraft hangar which can be supported above the rotors of an aircraft and which is readily adjustable and which is further easily deployable with minimal user effort.

SUMMARY OF THE INVENTION

It is therefore one of the objectives of this invention to provide a portable aircraft hangar which is designed to be suspended above the rotors of an aircraft.

It is also an object of this invention to provide a portable aircraft hangar that is fully adjustable such that it can accommodate aircraft of various sizes and shapes.

Still another object of this invention is to provide a portable aircraft hangar that can be easily deployed over an aircraft with minimal amounts of user effort.

These and other objectives are accomplished by providing a portable aircraft hangar assembly for use with an aircraft having a series of rotor blades and a bifilar dampener. The assembly includes a series of bifilar mounts, with the lower end of each mount being removably secured within the bifilar dampener. Each of the mounts further includes an upper free end. A cross support is used to interconnect the series of mounts.

The assembly further includes a canopy which is positioned over the rotor blades. The canopy is defined by a series of edges and upper and lower surfaces. A series of adjustment straps extend from each of the edges of the canopy, with each strap having a distal end and a coupling member secured along its length. The bifilar mounts are used in supporting the canopy over the rotor blades by positioning the upper ends of the bifilar mounts within a series of mounting holes formed within the lower surface of the canopy.

The assembly also includes a series of rotor sleeves that are positioned over the ends of each rotor blade. Each of these sleeves includes an adjustment strap and a coupling member secured thereto. The coupling members of the canopy are adapted to be interconnected with the coupling members of the rotor sleeves. An operator can then remove excess slack in the adjustment straps by pulling on the distal ends of the canopy adjustment straps.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIGS. 3, 3a, 3b illustrate the portable hangar installed upon a UH60 Black Hawk, as well as the rotor sleeves and canopy edges;

FIGS. 4, 4a, 4b illustrate the bifilar mounts of the present invention,

FIGS. 5, 5a, 5b, 5c illustrate a series of bifilar mounts of the present invention, utilizing cross support;

FIGS. 9, 9a illustrate the installation of the extension panels of the present invention.

Similar reference characters refer to similar parts throughout the several views of the drawings.

DETAILED DESCRIPTION OF THE PREFERRED EMBODIMENT

The present invention relates to a portable aircraft hangar assembly for use with aircraft having a series of rotor blades. The assembly is specifically designed to support a canopy over the series of rotor blades. This is accomplished by positioning a series of mounts between the undersurface of the canopy and the rotor assembly of the helicopter. The assembly further includes rotor sleeves which can be slid over the ends of each rotor blade. The rotor sleeves are connected to the canopy by way of a series of adjustment straps and coupling members. The various components of the present invention, and the manner in which they interrelate, will be described in greater detail hereinafter.

Figure 1:
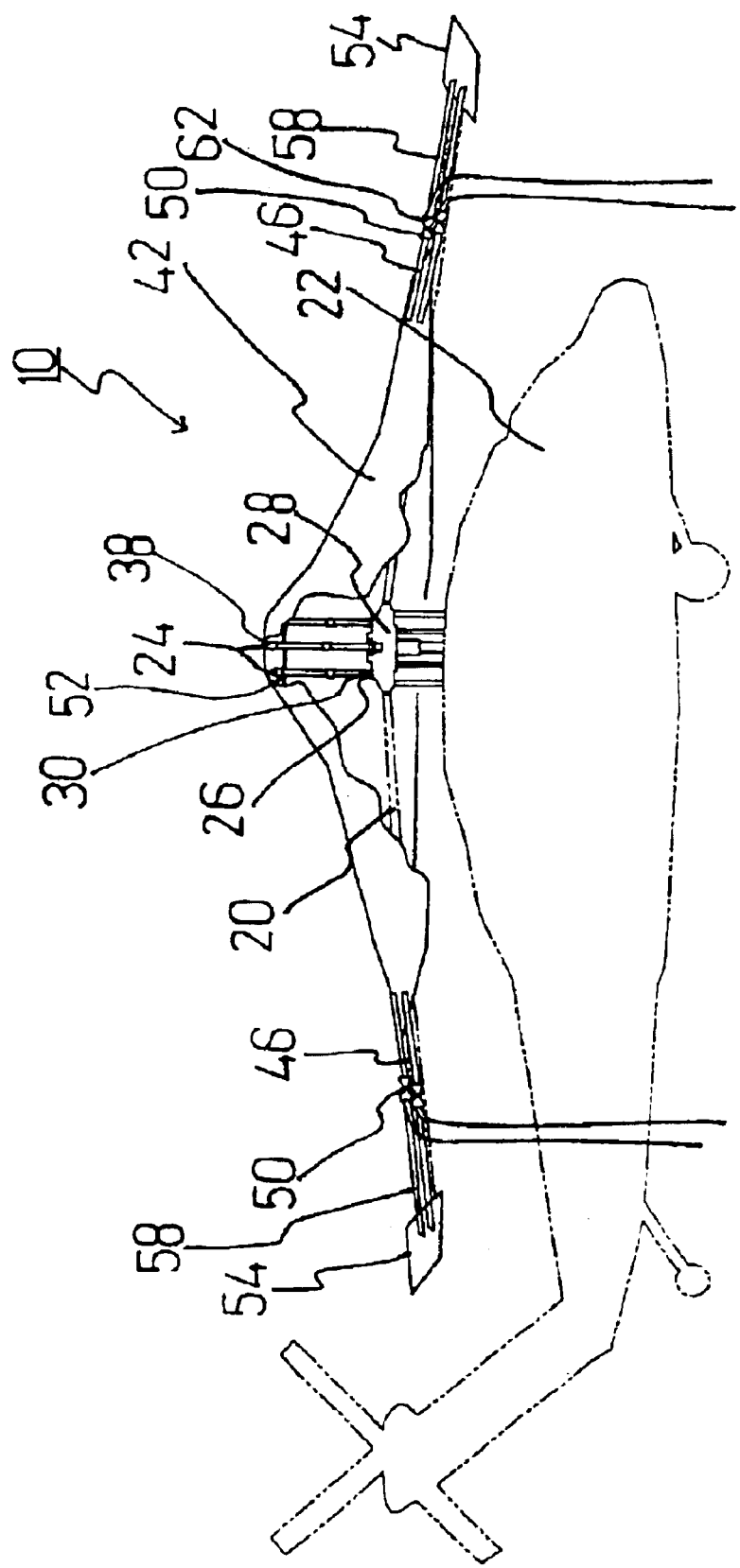
FIG. 1 is a side elevational view of the portable hangar of the present invention installed upon a UH60 Black Hawk helicopter.
Figure 2:
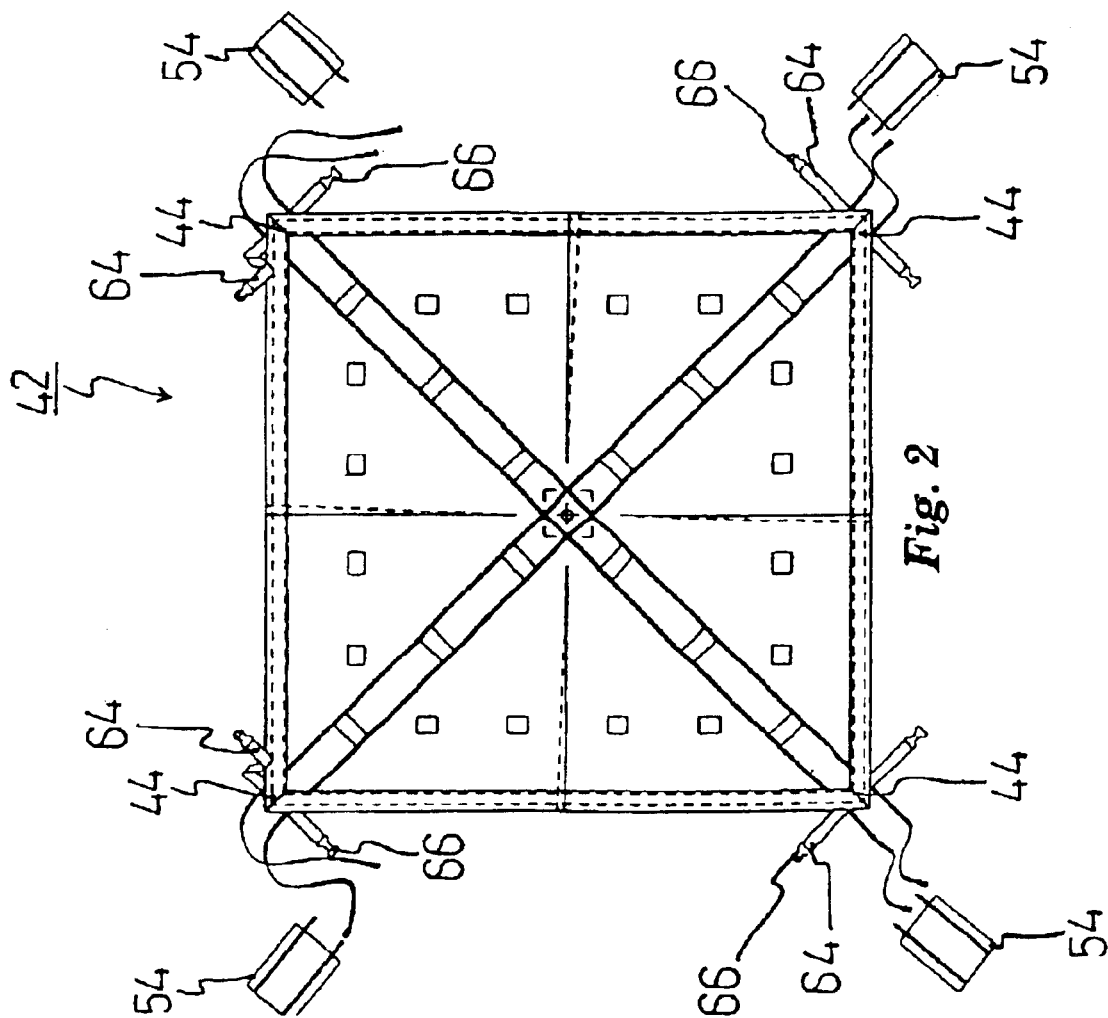
FIG. 2 is a plan view of the canopy and rotor sleeves.

With reference now to FIG. 1, the portable aircraft hangar assembly 10 of the present invention is depicted. FIG. 1 illustrates the hangar in its deployed and fully erected configuration. As illustrated in the partial sectional view, the hangar 10 is supported over top of a series of rotor blades 20. In the particular example illustrated, the hangar is deployed over a UH60 Black Hawk helicopter 22 employing four rotor blades 20. However, the present invention is not limited to any particular number of rotor blades, nor is the invention limited to any specific type of aircraft.

With reference now to FIGS. 5, 5a, 5b, 5c, the mounts 24 of the present invention are depicted. Specifically, the assembly includes a series of bifilar mounts 24. In the preferred embodiment, there are four such bifilar mounts 24. The mounts 24 are constructed to have their lower ends 26 inserted within the rotor assembly of the aircraft. In the preferred embodiment, the rotor assembly takes the form of a bifilar dampener 28. As is known in the art, a bifilar dampener 28 forms part of the rotor assembly and minimizes translation of vibrational forces from the rotor blades 20 to the rotor shaft.

As specifically illustrated in 5a, the lower ends 26 of each of the bifilar mounts 24 is inserted into apertures 30 in the bifilar. Thereafter, the threaded lower end 32 of each bifilar mount is secured by way of a threaded end cap 34. Additionally, in the preferred embodiment each bifilar mount 24 is formed of two cylindrical pieces that are threadably interconnected to one another. However, it is within the scope of the present invention to make each bifilar mount from a single integral piece.

FIG. 5b discloses a cross support 36 that can be used to stabilize the bifilar mounts 24 once they are secured to the bifilar apertures 30. The cross support 36 is interconnected to the upper extent of each of the mounts 24 and improves the overall structural rigidity of the assembled mounts 24. As can be seen from FIG. 5a, each of the mounts 24 preferably includes a rounded upper end 38.

Figure 5:
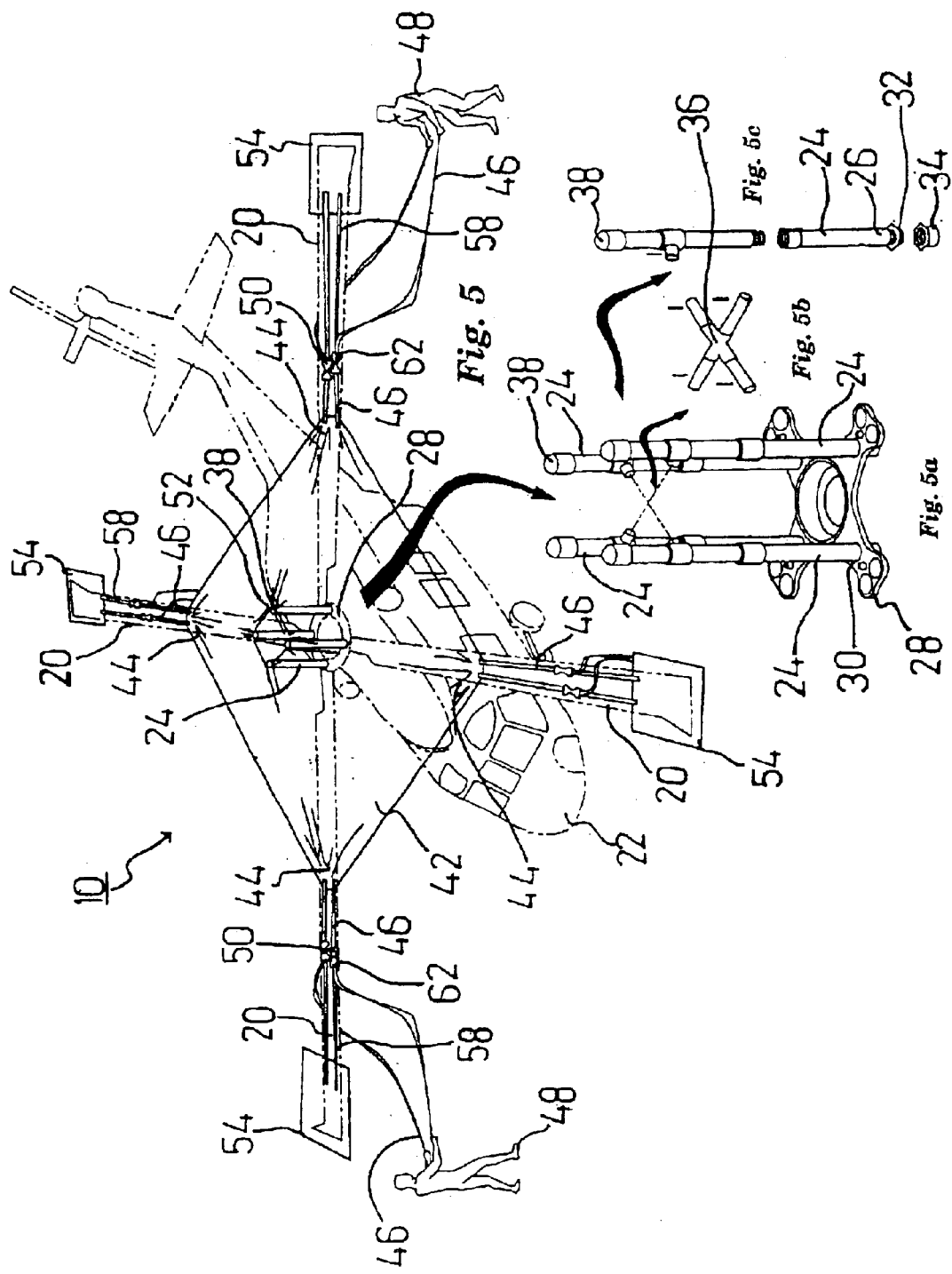

FIG. 5 illustrates canopy 42 positioned over rotor blades 20. In the preferred embodiment, this canopy 42 is squared and includes four corners 44. The present invention, however, is not limited to any particular shape of canopy 42 and other canopy shapes can be utilized to accommodate aircraft of varying sizes with rotors of varying numbers. The canopy 42 further includes upper and lower surfaces.

With continuing reference to FIG. 5, the adjustment straps 46 of canopy 42 are depicted. That is, a series of adjustment straps 46 extend from each of the corner edges 44 of the canopy 42. In the preferred embodiment, there are eight such straps (two straps radiating outwardly from each corner 44 of the canopy 42). Preferably, each of these straps is long enough to extend down the length of the rotor blade 20 and thereafter reach the ground, so as to be accessible by an operator 48. Furthermore, each of the adjustment straps 46 has a coupling member 50 slidably secured along its length. This coupling member 50 can take any number of forms such as a buckle, a clasp, hooks, or the like. The function of these adjustment straps 46 and coupling members 50 will be described in greater detail hereinafter.

Canopy 42 is supported a distance above the rotor blades 20 and bifilar dampener 28 by way of the bifilar mounts 24. In this regard, in the lower surface of the canopy 42, a series of mounting holes 52 are included to receive the upper rounded ends 38 of the bifilar mounts 24. This is illustrated in FIG. 1. Preferably, mounting holes 52 do not extend all the way through the canopy 42, but just a sufficient degree to permit insertion and positioning of the bifilar mounts 24. Thus, when properly installed, the bifilar mounts 24 are interconnected between the undersurface of the canopy 42 and the bifilar dampener 28.

The hangar assembly 10 further includes a series of rotor sleeves 54. As can be appreciated from FIG. 5, the number of rotor sleeves 54 is equal to the number of aircraft rotor blades 20. When deployed, these sleeves 54 are positioned over the ends of each rotor blade 20. Specifically, the sleeves 54 form a pocket 56 that can be slid over the tips of each blade 20. The sleeves 54 further include an adjustment strap 58 with a coupling member 62 secured to its distal end. The coupling member 62 is of the same type employed on the adjustment straps 46 of the canopy 42 and are adapted to be releasably interconnected thereto. Thus, when properly installed, the coupling members of the canopy 50 are releasably interconnected to the coupling members 62 of the rotor sleeves 54. Once this coupling is achieved, any excess slack along the length of the adjustment straps (46 and 58) can be taken up by having a user 48 grab the distal end of the canopy adjustment straps 46 and pulling downwardly. Due to the length of the canopy straps, this can be achieved while the user 48 is standing on the ground beneath the rotor blades 20. This has the effect of "cinching up" the straps, and it has the additional effect of taking up any slack that may be present within the canopy 42. Consequently, any sagging in the canopy 42 will be removed and canopy 42 will pop up over blades 20 in a tent-like fashion.

Figure 3:
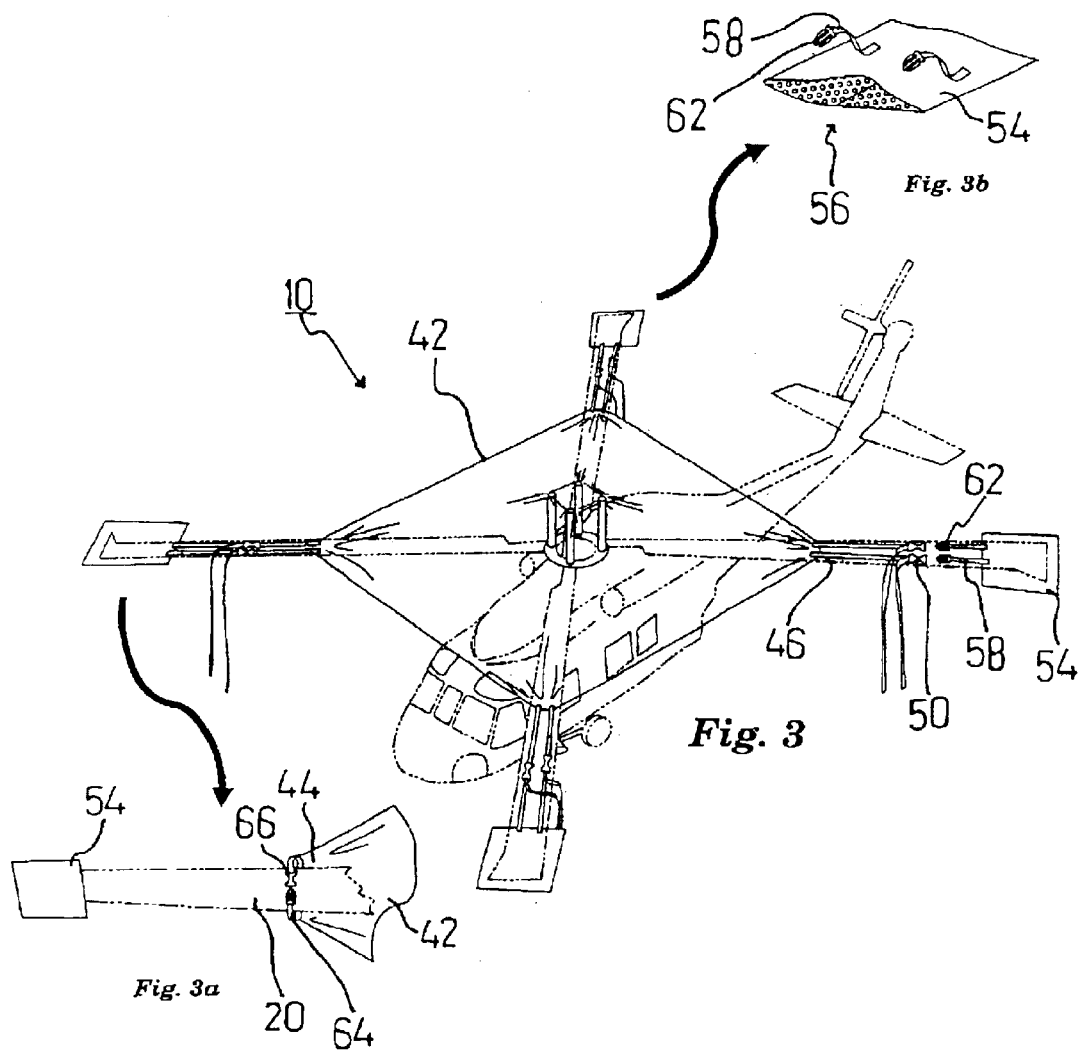

FIG. 3a illustrates an additional feature of the coupling straps. That is, FIG. 3a illustrates an additional adjustment strap 64 that is included at the corners 44 of the canopy 42. These adjustment straps 64 are secured widthwise over each rotor blade 20 and include associated fasteners 66. The straps 64 and fasteners 66 ensure a tight fit between the canopy 42 and associated rotor blade 20.

Figure 4:
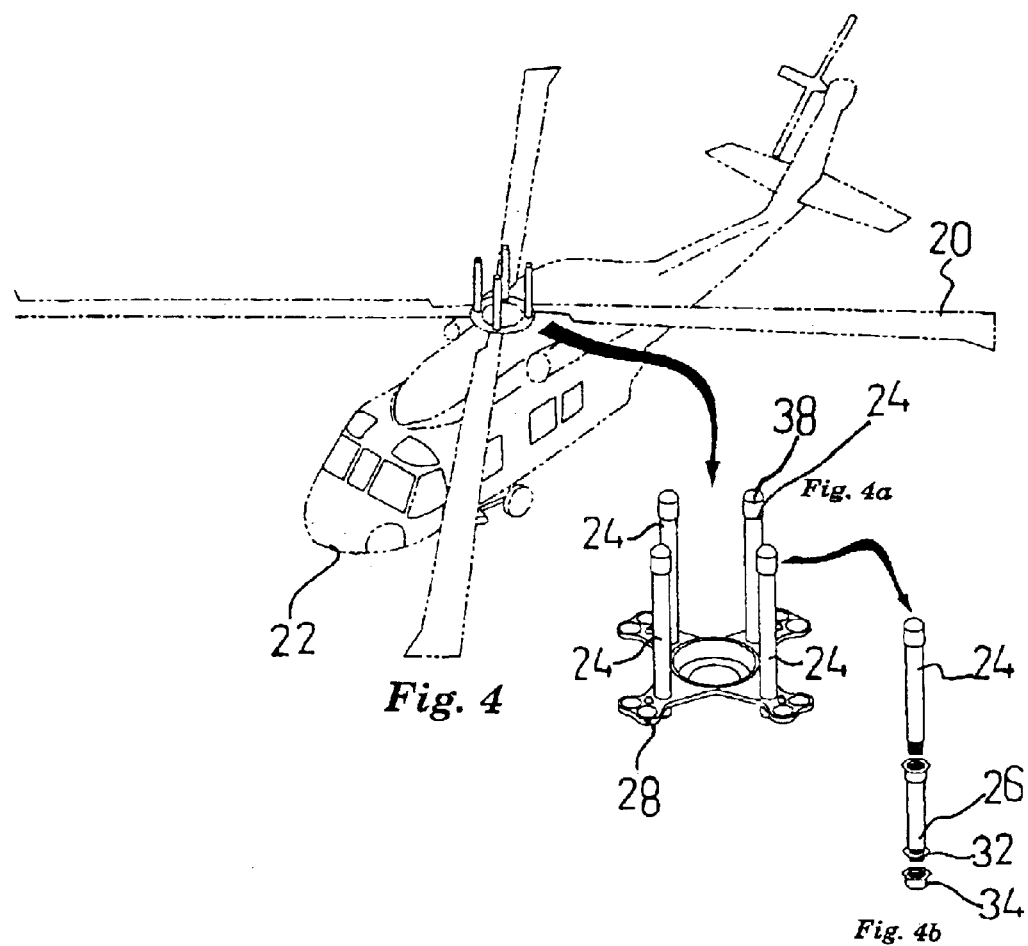

FIG. 4 illustrates an alternative embodiment of the present invention. Specifically, as illustrated in 4a, the bifilar mounts 24 are included without the need of a cross support. Cross supports can be eliminated when the bifilar mounts 24 are short enough such that no lateral stability is needed.

Figure 7:
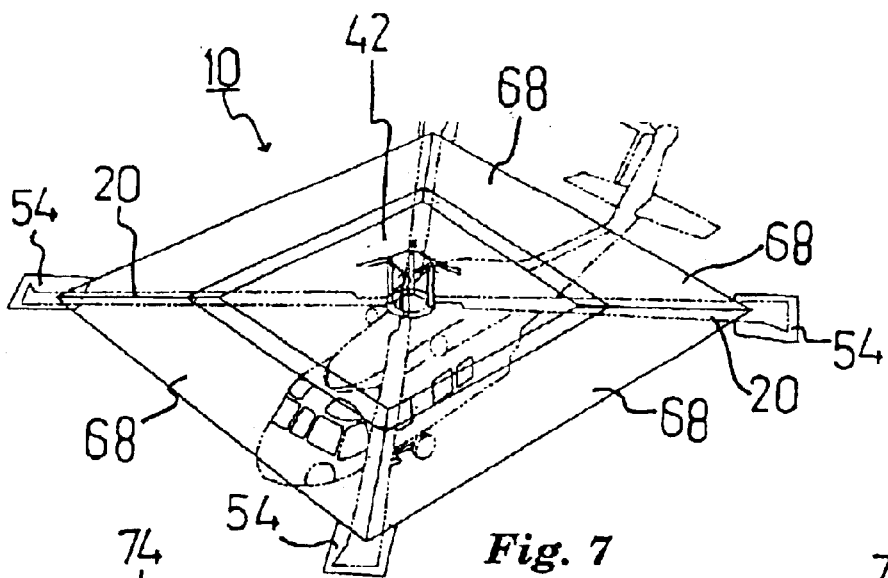
FIG. 7 is an illustration of the portable aircraft hangar with an extension panel.
Figure 8:
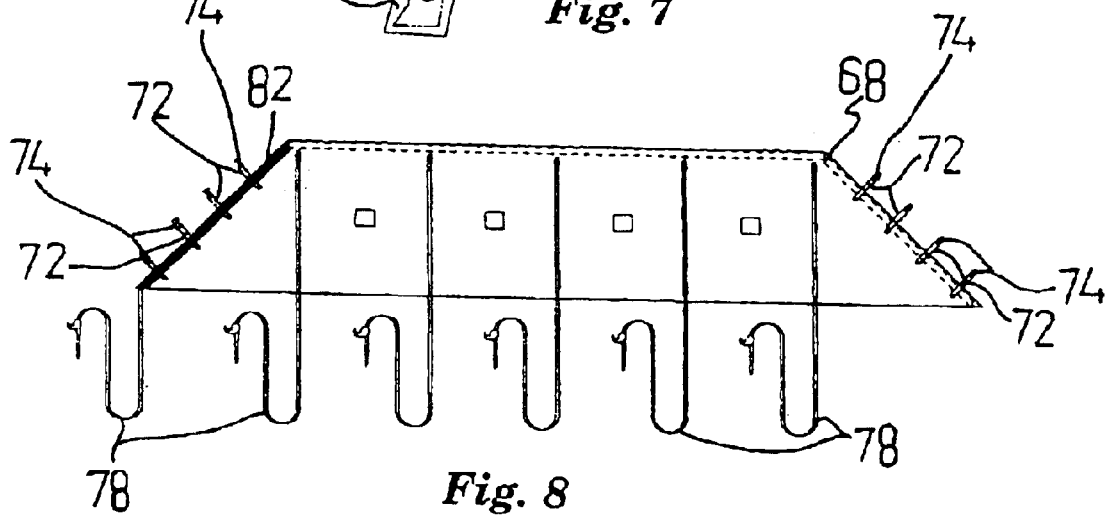
FIG. 8 is an illustration of one of the extension panels of the present inventions.

Still yet another embodiment of the present invention is depicted in FIGS. 7 and 8. In this alternate embodiment, the canopy 42 includes a series of extension panels 68 that are coupled to its peripheral extent. This has the advantage of allowing the canopy 42 to be extended over the entire length of the rotor blades 20. One of the specific extension panels 68 is depicted in FIG. 8. Each extension panel 68 includes a series of adjustment straps 72 and fasteners 74 along three of its four edges. Additionally, tie-down straps 78 are included at the outer edge of the extension panel 68. FIGS. 9 and 9a illustrate how the extension panel 68 is secured to the main canopy 42. That is, the coupling fasteners 74 of the extension panel 68 are coupled to coupling fasteners 76 included at the outer edge of the existing canopy 42.

Figure 6:
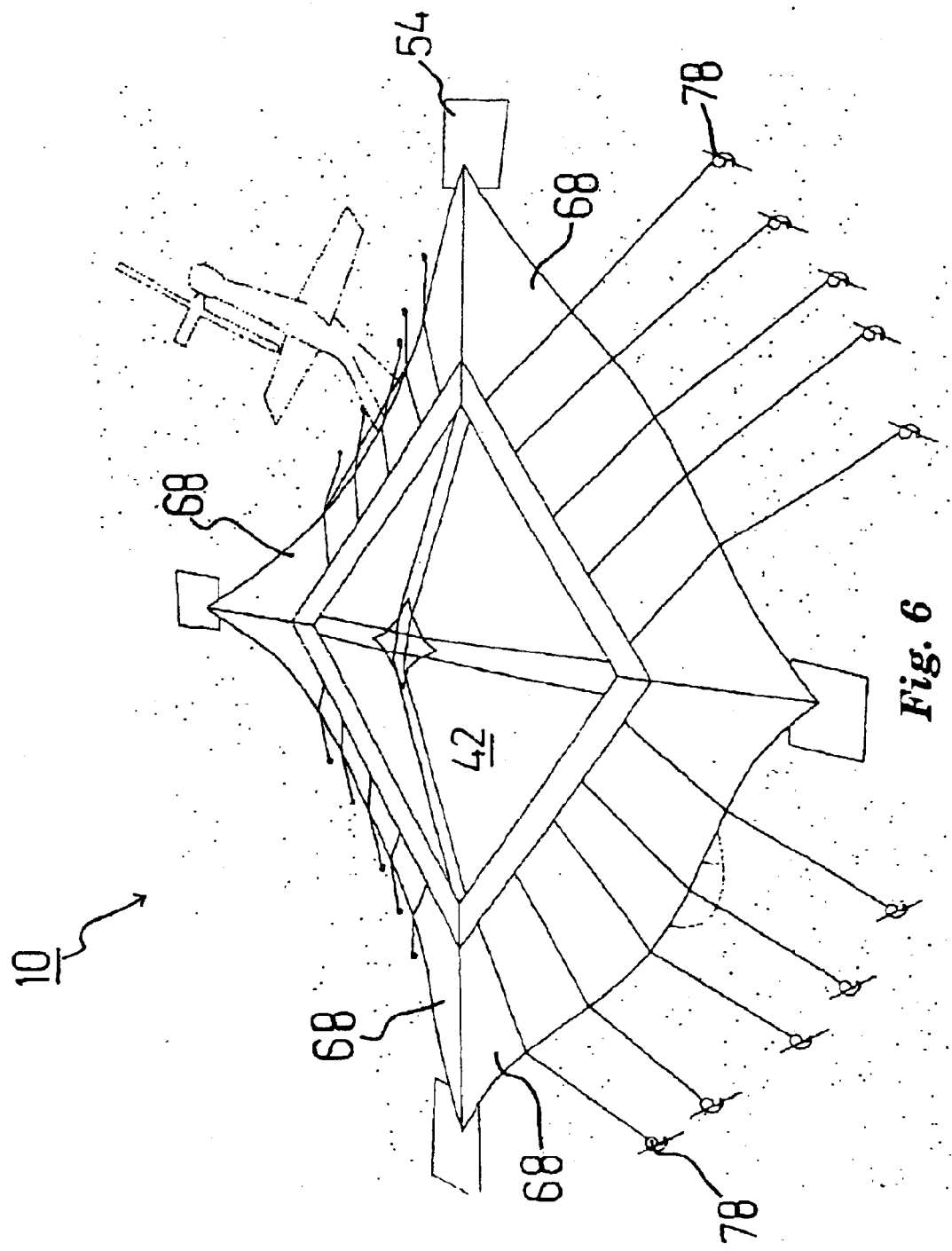
FIG. 6 is an illustration of the portable aircraft hangar deployed, with extension panels.

Additionally, Velcro fasteners 82 may be used to secure the edges of the extension panel 68 to the canopy 42. Once the extension panels 68 are attached, the canopy 42 is secured over the rotor blades 20 in the same manner as described in conjunction with the preferred embodiment. Once the canopy 42 is secured over the rotors 20, the tie-down straps 78 of the extension panels 68 can then be secured into the ground. This gives the overall canopy 42 additional wind resistance. The canopy 42 with extension panels 68 and tie-down straps 78 is depicted in FIG. 6.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described.

What is claimed is:

1. A portable hangar assembly for use with aircraft having a series of rotor blades and a bifilar dampener, the hangar assembly comprising:

series of bifilar mounts, each mount having a lower end removably secured within the bifilar dampener and an upper free end, a cross support interconnecting the series of bifilar mounts;

a canopy positioned over the rotor blades, the canopy defined by a series of edges, and upper and lower surfaces, a series of adjustment straps extending from each of the edges of the canopy, each strap having a distal end and a coupling member secured along its length, a series of mounting holes formed within the lower surface of the canopy, with the upper free ends of the bifilar mounts positioned within the mounting holes to thereby support the canopy above the series of rotor blades;

a series of rotor sleeves positioned over the ends of each rotor blade, each sleeve having an adjustment strap secured thereto with a coupling member secured to a distal end of the adjustment strap, the coupling members of the canopy being interconnected to the coupling members of the rotor sleeves, wherein excess slack in the adjustment straps can be taken up by pulling the distal ends of canopy adjustment straps.

2. A portable hangar assembly comprising:

a canopy positioned over rotor blades of an aircraft, a series of adjustment straps extending from the canopy, a coupling member connected to each of the adjustment straps;

a series of rotor sleeves positioned over the ends of each rotor blade, each sleeve having an adjustment strap secured thereto with a coupling member secured to each of the adjustment straps, the coupling members of the canopy being interconnected to the coupling members of the rotor sleeves.

3. The hangar as described in claim 2 wherein excess slack in the adjustment straps can be taken up by pulling on distal ends of the canopy adjustment straps.

4. The hangar as described in claim 3 wherein taking up excess slack in the adjustment straps results in the canopy being raised above the rotor blades.

5. The hangar as described in claim 2 wherein the canopy is supported over the rotor blades by a series of bifilar mounts.

6. A portable hangar assembly for use with aircraft having a series of rotor blades and a rotor assembly, the hangar assembly comprising:

a series of mounts, each mount having a lower end removably secured within rotor assembly and an upper free end;

a canopy positioned over the rotor blades, the canopy defined upper and lower surfaces, with the upper free ends of the mounts supporting the lower surface of the canopy to thereby support the canopy above the series of rotor blades.

7. The portable hangar assembly as described in claim 6 wherein a series of mounting holes are formed within the lower surface of the canopy and wherein the upper free ends of the mounts are secured within the mounting holes to thereby support the canopy above the series of rotor blades.

8. The portable hangar assembly as described in claim 6 wherein the rotor assembly is a bifilar dampener.

9. The portable hangar assembly as described in claim 6 wherein a cross support is interconnected between the series of bifilar mounts.

10. The portable hangar assembly as described in claim 6 wherein the hangar includes a series of sleeves slid over the ends of the rotor blades and wherein the sleeves are interconnected to the canopy by way of a series of adjustment straps.

* * * * *